(12) United States Patent
Abe

(10) Patent No.: US 8,325,992 B2
(45) Date of Patent: Dec. 4, 2012

(54) AUTHENTICATION METHOD, REGISTRATION APPARATUS, COLLATION APPARATUS, AND PROGRAM

(75) Inventor: Hiroshi Abe, Tokyo (JP)

(73) Assignee: Sony Corporation, Tokyo (JP)

( * ) Notice: Subject to any disclaimer, the term of this patent is extended or adjusted under 35 U.S.C. 154(b) by 674 days.

(21) Appl. No.: 12/447,198

(22) PCT Filed: Oct. 25, 2007

(86) PCT No.: PCT/JP2007/071269
§ 371 (c)(1),
(2), (4) Date: Apr. 24, 2009

(87) PCT Pub. No.: WO2008/050902
PCT Pub. Date: May 2, 2008

(65) Prior Publication Data
US 2010/0040294 A1 Feb. 18, 2010

(30) Foreign Application Priority Data
Oct. 27, 2006 (JP) ................................ 2006-292642

(51) Int. Cl.
*G06K 9/00* (2006.01)
(52) U.S. Cl. ........................................................ 382/115
(58) Field of Classification Search ................ None
See application file for complete search history.

(56) References Cited

U.S. PATENT DOCUMENTS
2006/0117188 A1* 6/2006 Fiske et al. ............... 713/186

FOREIGN PATENT DOCUMENTS
| JP | 10-55442 | 2/1998 |
| JP | 2002-259345 | 9/2002 |
| JP | 2006-139415 | 6/2006 |

OTHER PUBLICATIONS

English translation of JP 2006139415 A, translation date Dec. 2011, pages cover plus 1-45.*

* cited by examiner

*Primary Examiner* — Brian P Werner
(74) *Attorney, Agent, or Firm* — Finnegan, Henderson, Farabow, Garrett & Dunner LLP

(57) ABSTRACT

The present invention improves authentication accuracy. A first ranking among a plurality of reduced registration images is determined based on the similarities of the plurality of reduced registration images with respect to each of the reduced registration images used as a reference. Further, a second ranking among the plurality of reduced registration images is determined based on the similarities of the plurality of reduced registration images with respect to a reduced comparison image. Then, in the case where none of first ranking data has a ranking correlation value with respect to second ranking data equal to or larger than a predetermined threshold, it is determined that authentication has failed.

10 Claims, 10 Drawing Sheets

AUTHENTICATION METHOD, REGISTRATION APPARATUS, COLLATION APPARATUS, AND PROGRAM

CROSS REFERENCE TO RELATED APPLICATIONS

This application is a national phase application based on PCT/JP2007/071269, filed Oct. 25, 2007, which claims the priority of Japanese Patent Application No. 2006-292642, filed Oct. 27, 2006, the contents of both of which are incorporated herein by reference.

TECHNICAL FIELD

The present invention relates to an authentication method, a registration apparatus, a collation apparatus, and a program which are suitably applied to biometrics.

BACKGROUND ART

In recent years, a vein pattern has gotten attention as a biological characteristic. An authentication apparatus extracts a vein pattern in image data which is obtained as an imaging result of a finger or the like and determines that authentication is successful when a result of collation (correlation value) between the extracted vein pattern and registered vein pattern is equal to or larger than a predetermined threshold.

Such an authentication apparatus may be provided with a function of preventing a third party from being erroneously approved as a valid user by the authentication apparatus, that is, a so-called spoofing.

For example, the authentication apparatus executes a first collation of collating authentication data input at authentication request time with registration data and a second collation of collating the authentication data with previous authentication data previously input and authenticated. When a result of the first collation shows coincidence and a result of the second collation does not show coincidence, the apparatus accepts authentication, while when both the results of the first and second collations show coincidence, the apparatus rejects authentication. With this configuration, if a third party who has acquired authentication data that a valid user had input for authentication tries to use the authentication data, the apparatus can reject authentication (refer to, e.g., Patent Document 1).

When, e.g., a radish is picked up as image data in place of a finger, a pattern (hereinafter, referred to as a pseudo vein pattern) similar to a vein pattern can be obtained since vessels, phloems, bundles, and the like that run throughout the inside of the radish resemble the vessels in a human body. Thus, it is reported that "spoofing by a radish" is possible (refer to Non-Patent Document 1).

Patent Document 1: Jpn. Pat. Appln. Laid-Open Publication No. 2002-259345

Non-Patent Document 1: Tsutomu Matsumoto, "Biometrics in financial transactions," Apr. 15, 2005, Financial Services Agency—9th study group on fake cash card.

However, the above method detects spoofing based on the relationship (coincide or not coincide) between the current input and previous input, so that when a pseudo vein pattern is sequentially input using, e.g., a radish until it coincides with registration data, or when random number data that coincides with registration data in a pseudo manner is input, a situation may arise in which a third party is erroneously approved as a valid user, resulting in increased possibility of spoofing.

DISCLOSURE OF THE INVENTION

The present invention has been made in view of the above point, and an object thereof is to propose an authentication method, a registration apparatus, a collation apparatus, and a program capable of improving authentication accuracy.

To solve the above problem, according a first aspect of the present invention, there is provided an authentication method characterized by including: determining a first ranking among plurality of registration data based on the similarities of the plurality of registration data with respect to each of the plurality of registration data used as a reference; determining a second ranking among the plurality of registration data based on the similarities of the plurality of registration data with respect to data to be compared with the plurality of registration data; and determining failure of authentication regardless of success/failure of collation between the data to be compared and plurality of registration data in the case where a raking correlation value between the first rankings determined by using the plurality of registration data as references and second ranking is smaller than a predetermined threshold.

According to a second aspect of the present invention, there is provided a registration apparatus characterized by including: a ranking means for determining a ranking among plurality of registration data based on the similarities of the plurality of registration data with respect to each of the plurality of registration data used as a reference; and a storage control means for controlling a storage means to store the first rankings which have been determined using the plurality of registration data as references in the storage means.

According to a third aspect of the present invention, there is provided a collation apparatus characterized by including: a ranking means for determining a ranking among plurality of registration data based on the similarities of the plurality of registration data with respect to data to be collated with the plurality of registration data; a storage means for storing ranking among the plurality of registration data which has been determined based on the similarities of the plurality of registration data with respect to each of the plurality of registration data used as a reference; and a collation means for determining failure of authentication regardless of success/failure of collation between the data to be compared and plurality of registration data in the case where a raking correlation value between the ranking stored in the storage means which has been determined by using the plurality of registration data as references and ranking determined by the ranking determination means is smaller than a predetermined threshold.

According to a fourth aspect of the present invention, there is provided a program allowing a computer that controls a storage means to execute: determining a ranking among plurality of registration data based on the similarities of the plurality of registration data with respect to each of the plurality of registration data used as a reference; and storing the first rankings determined using the plurality of registration data as references in the storage means.

According to a fifth aspect of the present invention, there is provided a program allowing a computer that controls a storage means storing a ranking among plurality of registration data which has been determined based on the similarities of the plurality of registration data with respect to each of the plurality of registration data used as a reference to execute: determining a ranking among the plurality of registration data based on the similarities of the plurality of registration data with respect to data to be collated with the plurality of registration data; and determining failure of authentication regardless of success/failure of collation between the data to be compared and plurality of registration data in the case where a raking correlation value between the rankings stored in the storage means which have been determined by using the plurality of registration data as references and the determined ranking is smaller than a predetermined threshold.

According to the present invention, the authentication method ranks the plurality of registration data based on the similarity and uses the ranking itself as an element for determining the identification of a registrant. Therefore, in the case where the ranking correlation value is equal to or larger than a predetermined threshold, which means that the possibility that the comparison data is reduced registration data having the ranking correction value equal to or larger than a predetermined threshold is high and that the comparison data has a certain similarity with other registration data, so the authentication method can grasp that the reduced registration data has not been illegally input as pseudo data that temporarily coincides with the registration data.

As a result, even when pseudo data that temporarily coincides with the registration data is input, the authentication method prevents a third party from being erroneously approved as a valid user with a higher accuracy than a method of simply comparing the reduced comparison image and reduced registration image with each other. Thus, the authentication method, registration apparatus, collation apparatus, and program capable of improving authentication accuracy can be achieved.

BEST MODE FOR CARRYING OUT THE INVENTION

An embodiment of the present invention will be described in detail below with reference to the accompanying drawings.

Figure 1:
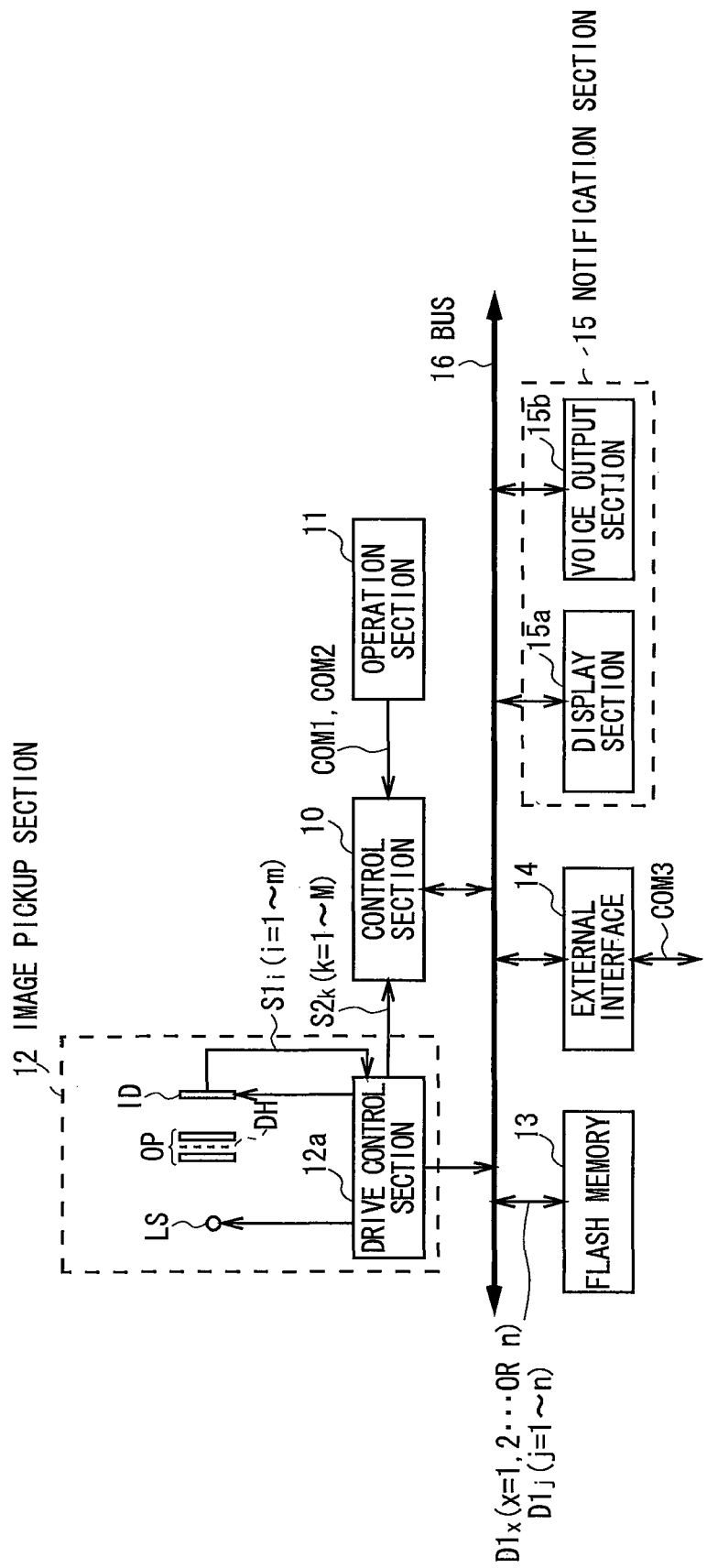
FIG. 1 is a block diagram showing a configuration of an authentication apparatus according to an embodiment of the present invention.

(1) Entire Configuration of Authentication Apparatus According to Present Embodiment FIG. 1 shows an authentication apparatus 1 according to the present invention. The authentication apparatus 1 includes a control section 10, an operation section 11, an image pickup section 12, a flash memory 13, an external interface 14, and a notification section 15. The operation section 11, image pickup section 12, flash memory 13, external interface 14, and notification section 15 are connected to the control section 10 through a bus 16.

The control section 10 is constructed as a microcomputer including a central processing unit (CPU) that controls the entire operation of the authentication apparatus 1, a read only memory (ROM) that stores various programs and various setting information, and a random access memory (RAM) that serves as a work memory for the CPU.

The control section 10 receives various commands from a user through the operation section 11. For example, the control section 10 receives an execution command COM 1 for executing a mode (hereinafter, referred to as "vein registration mode") of registering veins of a user to be registered (hereinafter, referred to as "registrant") or an execution command COM 2 for executing a mode (hereinafter, referred to as "authentication mode") of authenticating the registrant.

The control section 10 determines a mode to be executed based on the execution commands COM 1 and COM 2 and appropriately controls the image pickup section 12, flash memory 13, external interface 14, and notification section 15 based on a program corresponding to the determination so as to execute the vein registration mode or authentication mode.

(1-1) Vein Registration Mode

When the vein registration mode is determined to be executed, the control section 10 switches the operation mode to the vein registration mode and controls the operation of the image pickup section 12.

A drive control section 12a of the image pickup section 12 controls the drive of one or more near-infrared ray sources LS that irradiate a predetermined position in the authentication apparatus 1 with near-infrared light and an image pickup device ID such as a CCD (Charge Coupled Device).

The drive control section 12a adjusts the position of an optical lens in an optical system OP such that the focal point of the optical lens coincides with an object to be picked up. Further, the drive control section 12a adjusts the aperture of a diaphragm DH and shutter speed (exposure time) of the image pickup device ID based on an exposure value (EV (Exposure Value)) set by the control section 10.

In the authentication apparatus 1 of the present embodiment, a finger is adopted as an object to be picked up. When a finger is placed on a predetermined image pickup position of the authentication apparatus 1, near-infrared ray irradiated from the near-infrared ray source LS is reflected and dispersed in the finger to be passed through the finger and enters the image pickup device ID as vein projecting light that projects veins of the finger. The image pickup device ID photoelectric-converts the vein projecting light at a predetermined cycle and sends a result of the photoelectric conversion, as an image signal $S1_i$ (i=1, 2, 3, ..., m (m is an integer number)) to the control section 10 through the drive control section 12a.

The control section 10 determines presence/absence of a vein pattern based on the brightness of an image signal $S1_m$ which is input at the time when a registration start command is given from the operation section 11. When determining the presence of a vein pattern, the control section 10 applies predetermined image processing to the image signal $S1_m$ to extract the vein pattern from the image and stores the extracted image as registrant data (hereinafter, referred to as "registration image data") $D1_x$ (x=1, 2, 3, ..., or n) in the flash memory 13 for registration.

Further, when registering the registration data $D1_x$, the control section 10 determines whether the number of registrations for one registrant reaches a predetermined value. When determining that the number of registrations does not reach the predetermined value, the control section 10 notifies the registrant that the same finger needs to be placed on the image pickup position for reregistration by means of a corresponding message through the display section 15a of the notification section 15 and a corresponding voice output through the voice output section 15b and then registers a vain pattern corresponding to a plurality of positions on the image pickup position as registration data $D1_j$ (j=1, 2, 3, ..., n (n is an integer number)). In this manner, the control section 10 reduces the possibility that the registrant is regarded as a third party.

In this way, the control section 10 can perform the vein registration mode.

(1-2) Authentication Mode

When the authentication mode is determined to be executed, the control section 10 switches the operation mode to the authentication mode and controls the operation of the image pickup section 12 as in the case of the vain registration mode.

In this case, as in the case of the vein registration mode, the image pickup section 12 adjusts the position of the optical lens in the optical system OP, as well as adjusts the aperture of a diaphragm DH and shutter speed of the image pickup device ID based on an exposure value set by the control section 10 and sends an image signal $S2_k$ (k=1, 2, 3, ..., M (M is an integer number)) output from the image pickup device ID after the adjustment to the control section 10.

The control section 10 determines presence/absence of a vein pattern based on the brightness of the image signal $S2_k$. When determining the presence of a vein pattern, the control section 10 applies the same image processing as that in the vein registration mode to an image signal S2 as the image signal $S2_k$ and reads out the registration image data D1i from the flash memory 13.

Then, the control section 10 collates a vein pattern extracted as a result of the image processing with a vein pattern of one registration image data selected from the registration image data D1i to determine whether a person to be authenticated is identified as a registrant (a valid user based) on the coincidence level.

When it is determined that a person to be authenticated is a valid user, the control section 10 generates an execution command COM 3 for causing an operation processor (not shown) connected to the external interface 14 to execute predetermined operation and transfers the COM 3 to the operation processor through the external interface 14.

As an embodiment of: the operation processor connected to the external interface 14, when employing a door that is locked for example, the control section 10 transfers the execution command COM 3 to unlock the door to the door. Furthermore, as another embodiment of the operation processor, when employing a computer in a state under which, among plural operation modes, some operation modes are restricted, the control section 10 transfers the execution command COM 3 to make the restricted operation modes unrestricted to the computer.

As the embodiments, two examples are explained, to which the embodiment is not restricted, and other embodiments can be arbitrarily selected. Furthermore, in these embodiments, while the operation processor is connected to the external interface 14, the configuration of software and hardware of the operation processor may be loaded on the authentication apparatus 1.

On the other hand, when it is determined that a person to be authenticated is not a valid user, the control section 10 displays this determination on the display unit 15a of the notification section 15, and concurrently outputs a voice through a voice output section 15b of the notification section 15 so as to visually and aurally notifies that a person to be authenticated is not a valid user.

In this way, the control section 10 can perform the authentication mode.

(2) Specific Processing in Control Section

Next, part of specific processing performed by the control section in the vein registration mode and authentication mode will be explained individually.

(2-1) Processing in Vein Registration Mode

Figure 2:
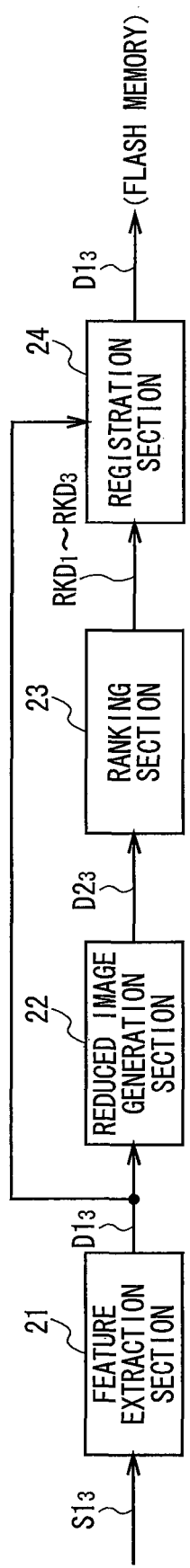
FIG. 2 is a block diagram showing a functional configuration of a control section in a vein registration mode.

As shown in FIG. 2, part of the processing performed by the control section 10 in the vein registration mode can be functionally performed by a feature extraction section 21, a reduced image generation section 22, a ranking section 23, and a registration section 24. Hereinafter, operations of the feature extraction section 21, reduced image generation section 22, ranking section 23, and registration section 24 will be described.

For the sake of convenience, it is assumed that a value set as the number of registrations for one registrant is three and that the registration image data $D1_1$ and $D1_2$ corresponding to the first and second registration operations have already been registered in the flash memory 13.

The feature extraction section 21 sequentially applies, e.g., A/D (Analog/Digital) conversion processing, contour extraction processing, image cutout processing, smoothing processing, binarizing processing, and thinning processing to the image signal $S1_m$ which is input from the image pickup section 12 at the time when the third registration start command is given from the operation section 11 to thereby extract a vein pattern in the image.

Further, the feature extraction section 21 sends image data obtained as a result of the above processing to the reduced image generation section 22 and registration section 24 as registration image data $D1_3$.

The reduced image generation section 22 reduces the image size of the registration image data $D1_3$ at a predetermined ratio and sends the registration image data (hereinafter, referred to as "reduced registration image data") whose size has been reduced $D2_3$ to the ranking section 23.

The ranking section 23 temporarily stores the reduced registration image data D2 supplied from the reduced image generation section 22 until the number of registrations for one registrant reaches a predetermined value. When receiving the reduced registration image data D2 ($D2_1$, $D2_2$, and $D2_3$) corresponding to the set number of registrations, the ranking section 23 determines the ranking among the reduced registration images based on the similarity.

Figure 3:
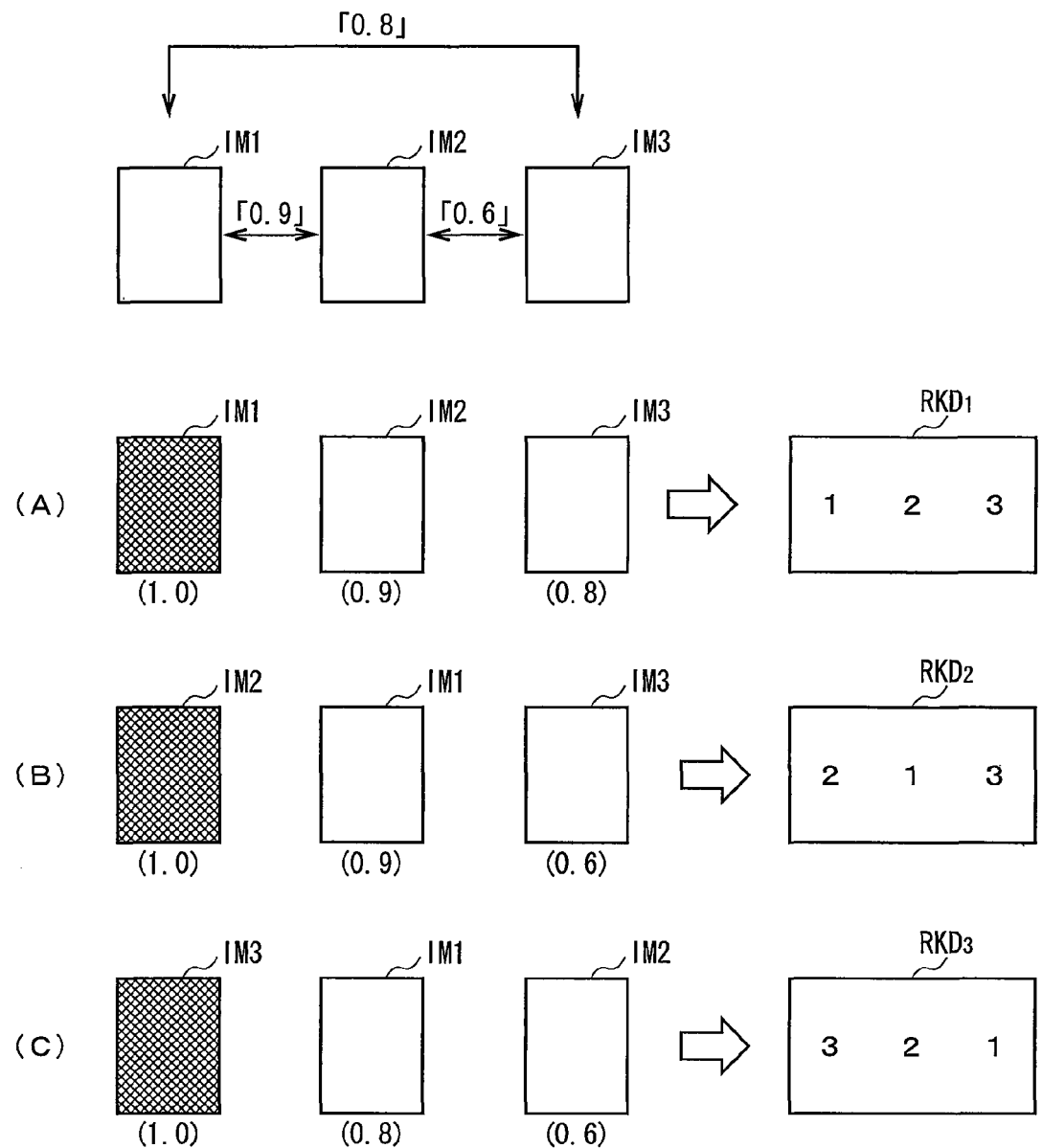
FIG. 3 is a view for explaining ranking among registration images.

Specifically, as shown in FIG. 3, the ranking section 23 calculates cross-correlation values among the reduced registration images IM1, IM2, and IM3 corresponding to the reduced registration image data. $D2_1$, $D2_2$, and $D2_3$. It is assumed in this example that the cross-correlation value between the reduced registration images IM1 and IM2 is "0.9", cross-correlation value between the reduced registration images IM1 and IM3 is "0.8", and cross-correlation value between the reduced registration images IM2 and IM3 is "0.6".

Then, as shown in: FIG. 3(A), the ranking section 23 sets the reduced registration image IM1 as a reference and determines the ranking among the reduced registration images IM1, IM2, and IM3 in the descending order in terms of the cross-correlation values of the reduced registration images IM1, IM2, and IM3 with respect to the reduced registration image IM1 set as a reference. Subsequently, the ranking section 23 sends data (hereinafter, referred to as "first ranking data") $RKD_1$ representing the determined ranking to the registration section 24.

Note that the reduced registration image IM1 set as a reference and reduced registration image IM1 are the same image, so that the cross-correlation value between them is "1".

Similarly, as shown in FIG. 3(B), the ranking section 23 sets the reduced registration image IM2 as a reference, determines the ranking among the reduced registration images IM1, IM2, and IM3 in the descending order in terms of the cross-correlation values of the reduced registration images IM1, IM2, and IM3 with respect to the reduced registration image IM2 set as a reference, and sends first ranking data $RKD_2$ representing the determined ranking to the registration section 24. Further, as shown in FIG. 3(C), the ranking section 23 sets the reduced registration image IM3 as a reference, determines the ranking among the reduced registration images IM1, IM2, and IM3 in the descending order in terms of the cross-correlation values of the reduced registration images IM1, IM2, and IM3 with respect to the reduced registration image IM3 set as a reference, and sends first ranking data $RKD_3$ representing the determined ranking to the registration section 24.

As described above, the ranking section 23 sets the reduced registration images IM1, IM2, and IM3 as references, respectively, and determines the ranking among the reduced registration images IM1, IM2, and IM3 in the descending order in terms of the similarity with respect to each reduced registration image IM set as a reference.

Figure 4:
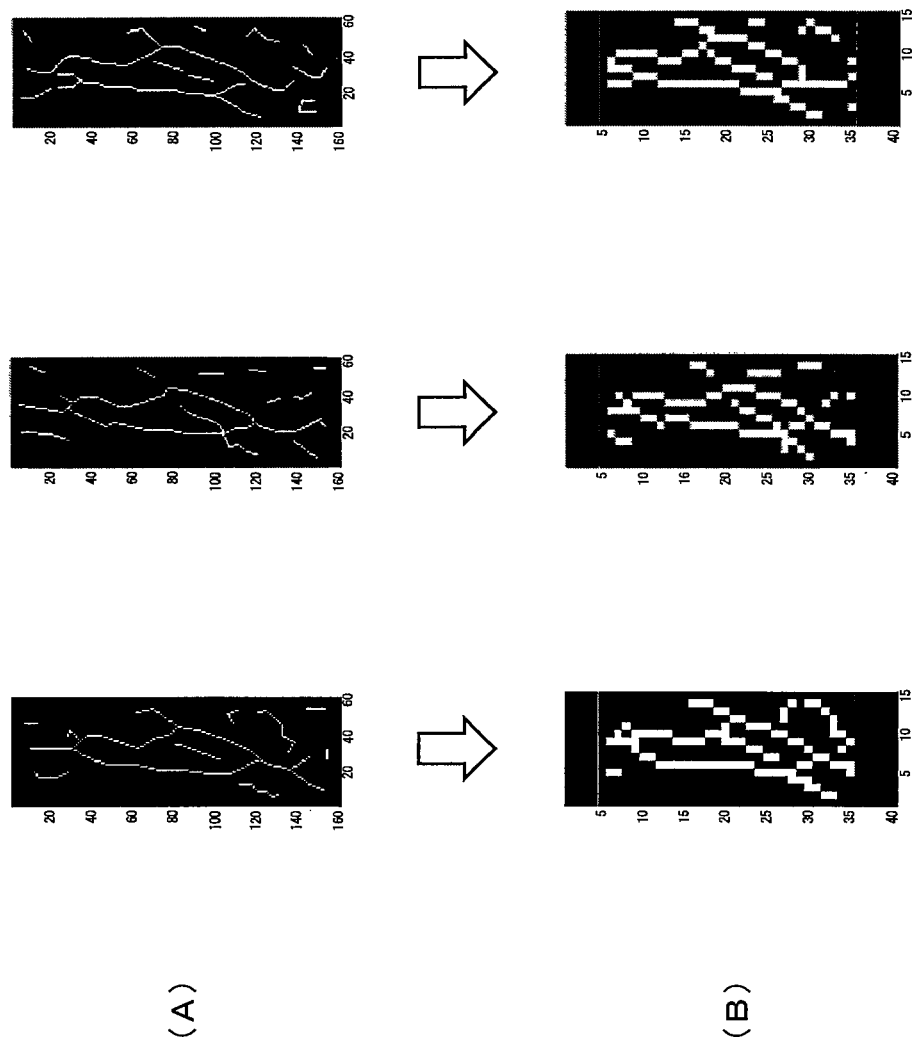
FIG. 4 is a view showing images before and after size reduction.

FIG. 4 shows images before size reduction (FIG. 4(A)) and images after size reduction (FIG. 4(B)). Numeral values plotted vertically and horizontally along the images shown in FIG. 4 each represent the image size [pixel]. The size of the image after size reduction is 1/16 of the size of the image before size reduction.

As is clear from FIG. 4, although the vein patterns become rougher after size reduction, a difference between them is clear. Therefore, the ranking section 23 can reduce the processing load required for calculating the similarity without reducing accuracy in the similarity calculation. As a result, the ranking section 23 can determine the ranking with accuracy and at short times.

The registration section 24 registers the $D1_3$ supplied from the feature extraction section 21 in the flash memory 13 and then registers the first ranking data $RKD_1$ to $RKD_3$ supplied from the ranking section 23 in association with the registration data $D1_1$ to $D1_3$ used as references of the ranking data RKD.

(2-2) Registration Processing Routine

Figure 5:
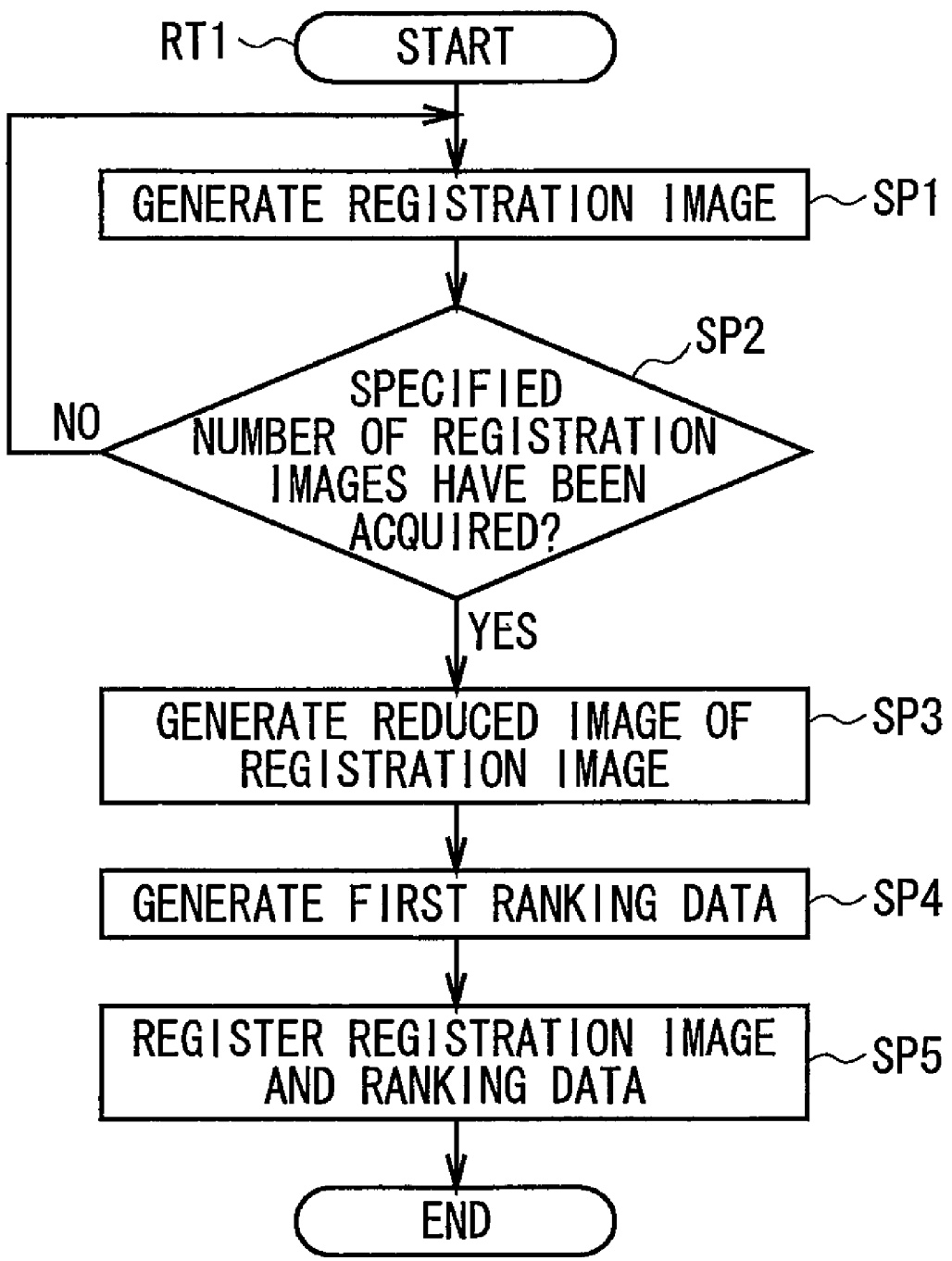
FIG. 5 is a flowchart showing a registration processing routine.

Next, a registration processing routine in the vein registration mode will be described. As shown in FIG. 5, when receiving the execution command COM 1 (FIG. 1) for executing the vein registration mode, the control section 10 starts a registration processing routine RT1, then generates a registration image in step SP1, and determines whether it has acquired registration images IM1 to IM3 corresponding to the set number of registrations in step SP2.

When determining that the registration images IM1 to IM3 corresponding to the set number of registrations have not been acquired, the control section 10 returns to step SP1 and repeats the above processing. On the other hand, when determining that the registration images IM1 to IM3 corresponding to the set number of registrations have been acquired, the control section 10 proceeds to step SP3 and reduces the sizes of the registration images to generate reduced generation images IM1 to IM3 (FIG. 3).

In step SP4, the control section 10 generates the ranking among the reduced registration images IM1 to IM3 as first ranking data $RKD_1$ to $RKD_3$ with the reduced registration images IM1 to IM3 sequentially used as references.

Then, in step SP5, the control section 10 registers the first ranking data $RKD_1$ to $RKD_3$ in the flash memory 13 in association with the registration image data $D1_1$, $D1_2$, $D1_3$ corresponding to the reduced registration images used as references of the ranking data $RKD_1$, $RKD_2$, and $RKD_3$ and ends the registration processing routine RT1.

In this way, the control section 10 can perform the vein registration mode.

(2-3) Processing in Authentication Mode

Figure 6:
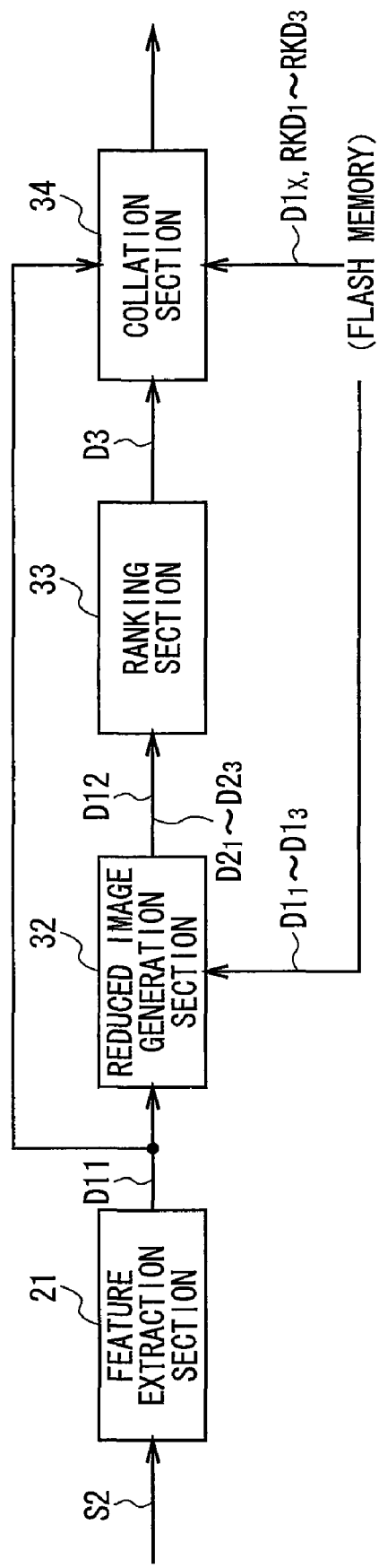
FIG. 6 is a block diagram showing a functional configuration of the control section in an authentication mode.

As shown in FIG. 6, in which the same reference numerals have been given to the same components as FIG. 2, part of the processing performed by the control section 10 in the authentication mode can be functionally performed by the feature extraction section 21, a reduced image generation section 32, a ranking section 33, and a collation section 34. Hereinafter, operations of the reduced image generation section 32, ranking section 33, and collation section 34 will be described.

For the sake of convenience, it is assumed that a value set as the number of registrations for one registrant is three and that the registration image data $D1_1$, $D1_2$, and $D1_3$ corresponding to the first, second, and third registration operations have already been registered in the flash memory 13.

The feature extraction section 21 applies various processing to one image signal S2 as the image signal S2$k$ supplied from the image pickup section 12 to generate data (hereinafter, referred to as "comparison data image") D11 of an image (hereinafter, referred to as "comparison image") to be compared with the registration image and sends the comparison image data D11 to the reduced image generation section 32.

The reduced image generation section 32 that has received the comparison image data D11 reduces the image size of the comparison image data D11 at a predetermined ratio and sends the comparison image data (hereinafter, referred to as "reduced comparison image data") D12 of the image (hereinafter, referred to as "reduced comparison image") whose size has been reduced to the ranking section 33.

Further, the reduced image generation section 32 reads out the registration image data $D1_1$, $D1_2$, and $D1_3$ that have been registered in the flash memory 13 in the vein registration mode, reduces the image sizes of the read out registration image data $D1_1$, $D1_2$, and $D1_3$ to generate reduced registration image data $D2_1$, $D2_2$, and $D2_3$, and sends them to the ranking section 33.

The ranking section 33 determines the ranking among the reduced registration image data $D2_1$, $D2_2$, and $D2_3$ based on the similarities of the respective reduced registration images with respect to the reduced comparison images of the reduced comparison image data $D1_2$.

Figure 7:
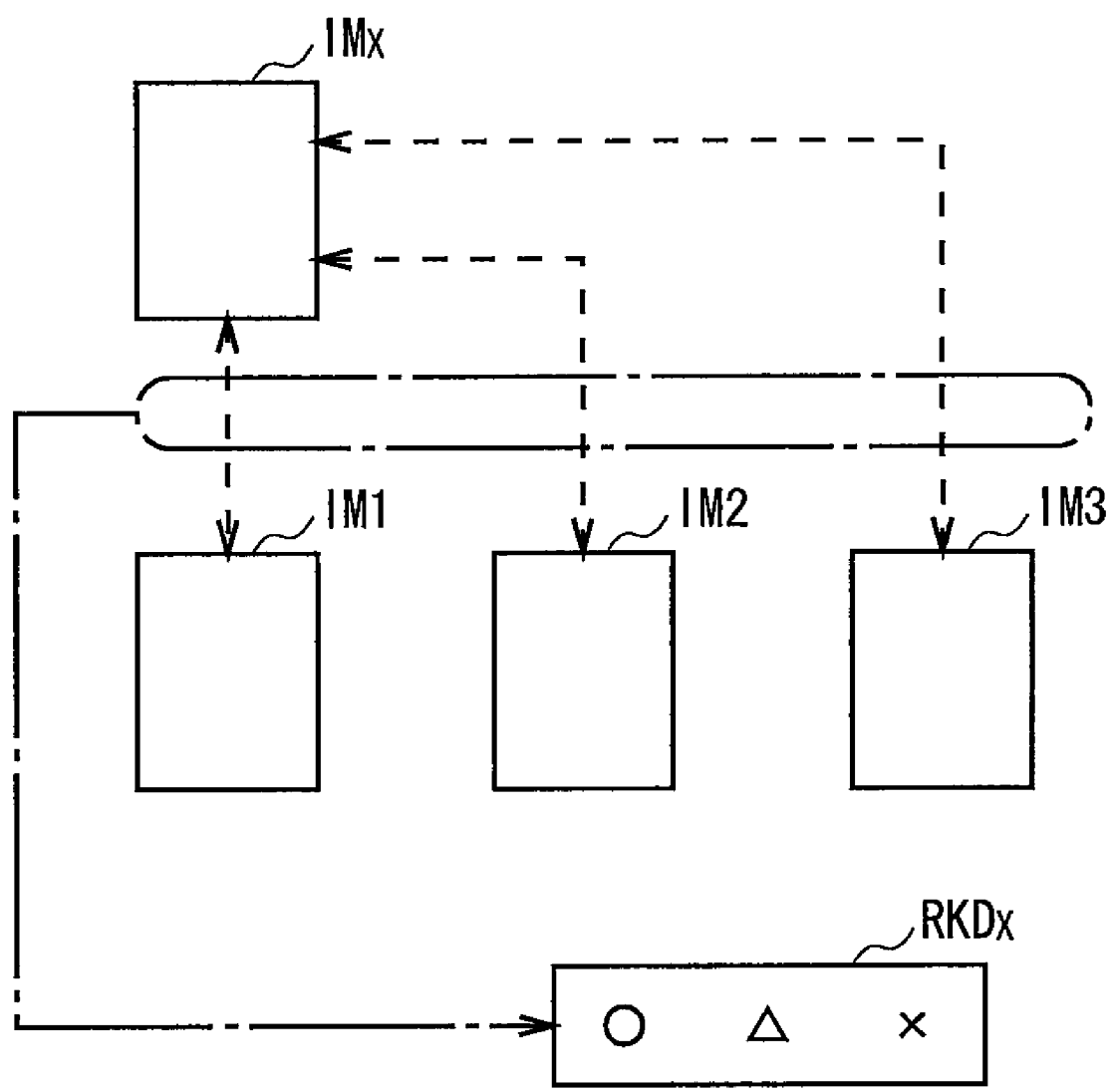
FIG. 7 is a view for explaining a ranking procedure based on the similarities between the collation image and registration image.

Specifically, as shown in FIG. 7, the ranking section 33 calculates the cross-correlation values of the respective reduced registration images IM1, IM2, and IM3 with respect to the reduced comparison image IMx. Then, the ranking-section 33 determines the ranking among the reduced registration images IM1, IM2, and IM3 in the descending order in terms of the cross-correlation value of the reduced registration images IM1, IM2, and IM3 with respect to the reduced comparison image IMx and sends data (hereinafter, referred to as "second ranking data") $RKD_x$ representing the ranking to the collation section 34.

Figure 8:
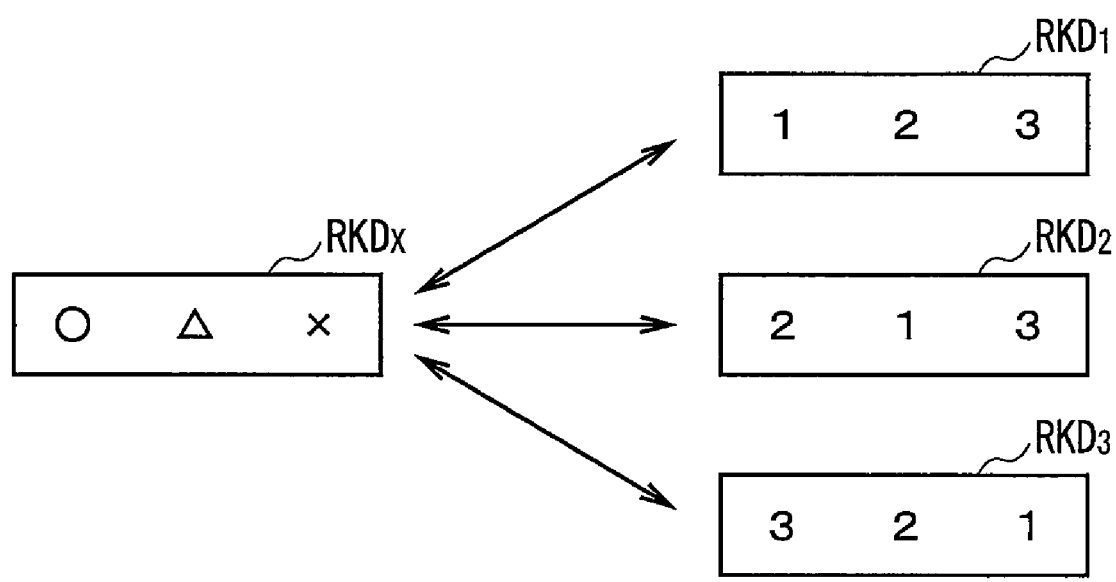
FIG. 8 is a view for explaining collation between ranking data.

As shown in FIG. 8, the collation section 34 reads out, from the flash memory 13, the first ranking data $RKD_1$, $RKD_2$, and $RKD_3$ that have been registered in the vein registration mode and collates them with the second ranking data $RKD_x$ supplied from the ranking section 33 based on a ranking correlation value.

In the case where any of the first ranking data $RKD_1$, $RKD_2$, and $RKD_3$ has a ranking correlation value with respect to the second ranking data $RKD_x$ equal to or larger than a predetermined threshold, which means that the possibility that the reduced comparison image IMx is a reduced registration image corresponding to the registration image having the ranking correction value equal to or larger than a predetermined threshold is high and that the reduced comparison image IMx has a certain similarity with other reduced registration images that have been compared to the reduced comparison image IMx, so it can be determined that the reduced registration image IMx has not been illegally input as pseudo data that temporarily coincides with the registration data.

In this case, the collation section 34 reads out, among the first rank data $RKD_1$, $RKD_2$, and $RKD_3$, the registration data $D1_1$ corresponding to, e.g., the first rank data $RKD_1$ that coincides with the second rank data $RKD_x$ and collates the image of the read out registration data $D1_1$ with the comparison image data D11 supplied from the feature extraction section 21 using a cross-correlation value between them. When the cross-correlation value is equal to or larger than a predetermined threshold, the collation section 34 determines that a person to be authenticated is a valid user, while when the cross-correlation is smaller than a predetermined threshold, the collation section 34 determines that a person to be authenticated is not a valid user.

On the other hand, in the case where none of the first ranking data $RKD_1$, $RKD_2$, and $RKD_3$ has a ranking correlation value with respect to the second ranking data $RKD_x$ equal to or larger than a predetermined threshold, which means that the reduced comparison image IMx does not coincide with any of the registration images IM1, IM2, and IM3 or that if the reduced comparison image IMx coincides with one registration image IM, the reduced registration image IMx is image data that has been illegally input as pseudo data that temporarily coincides with the registration data.

In this case, the collation section 34 determines failure of authentication, that is, stops the authentication mode.

(2-4) Authentication Processing Routine

Figure 9:
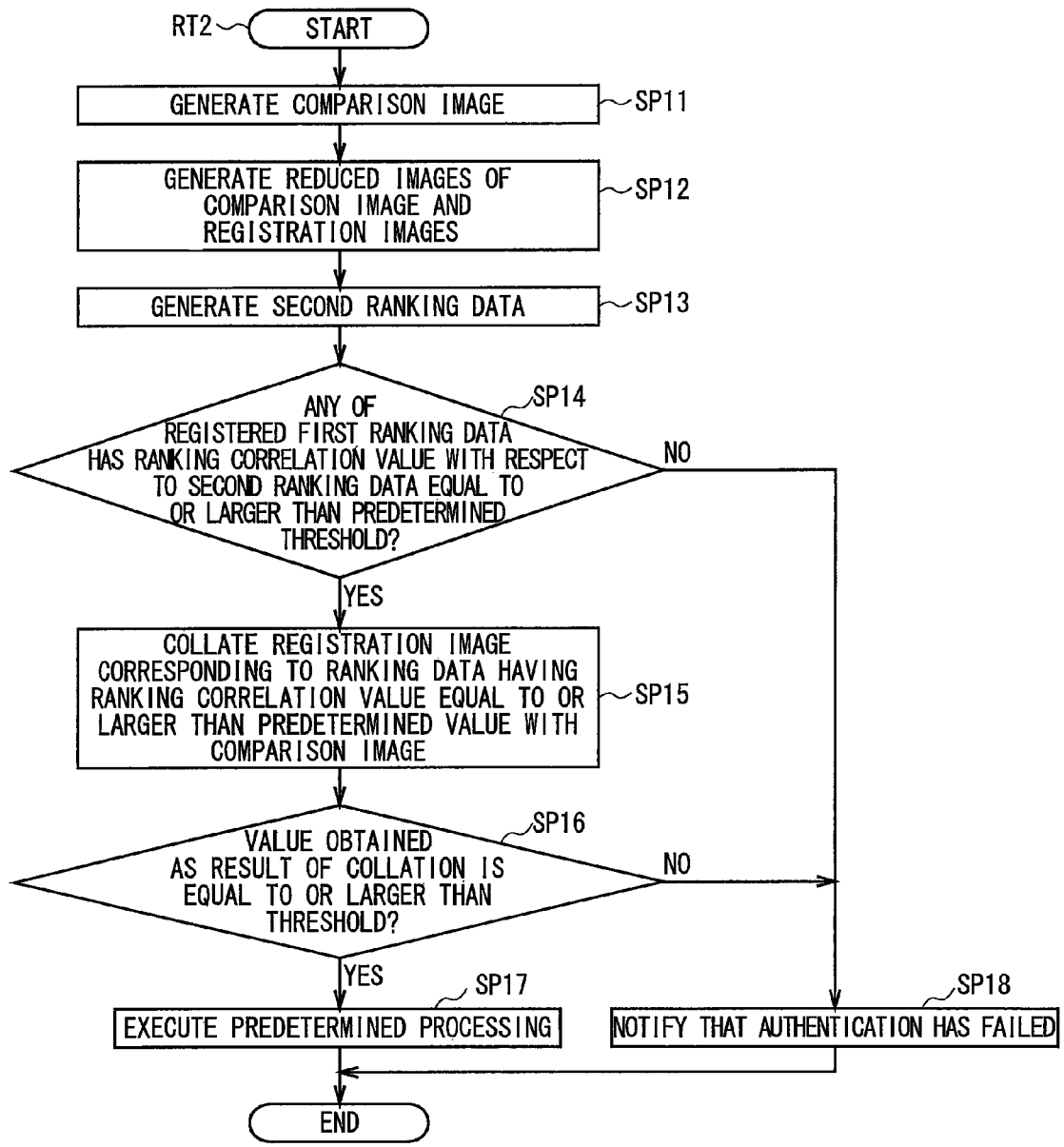
FIG. 9 is a flowchart showing an authentication processing routine.
Figure 10:
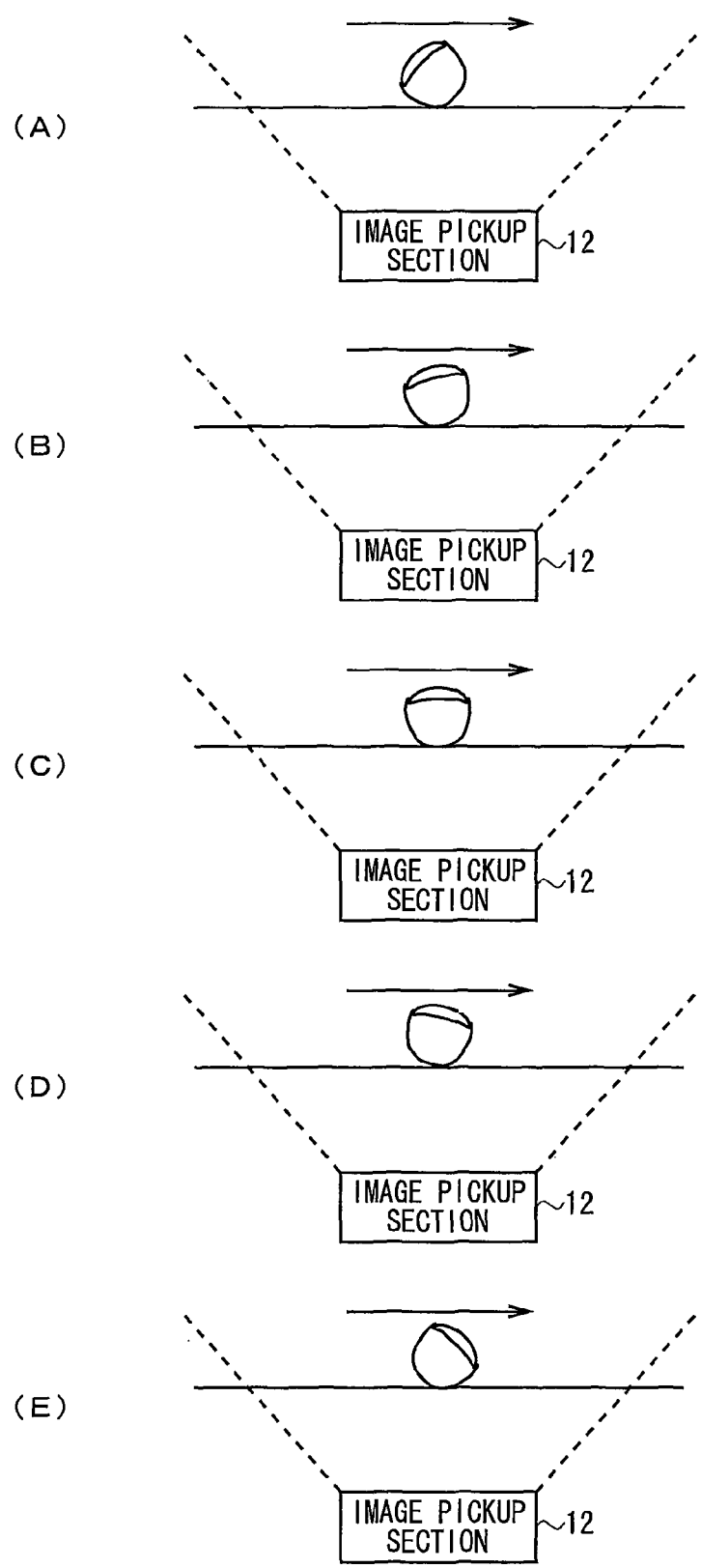
FIG. 10 is a view each showing a condition of image pickup operation of a finger.

Next, an authentication processing routine in the authentication mode will be described. As shown in FIG. 9, when receiving the execution command COM 2 (FIG. 1) for executing the authentication mode, the control section 10 starts an authentication processing routine RT2, then generates a comparison image in step SP11, and reduces the comparison image and plurality of registration images registered in the flash memory 13 to generate the reduced comparison image IMx (FIG. 7) and reduced registration images IM1 to IM3 (FIG. 7).

Then, as shown in FIG. 7, in step SP13, the control section 10 generates, as the second ranking data $RKD_x$, the ranking among the reduced registration images IM1 to IM3 based on the similarities of the reduced registration images IM1 to IM3 with respect to the reduced comparison image IMx. Subsequently, in step SP14, the control section 10 determines whether any of the first ranking data $RKD_1$, $RKD_2$, and $RKD_3$ registered in the flash memory 13 has a ranking correlation value with respect to the second ranking data $RKD_x$ equal to or larger than a predetermined threshold.

When determining that any of the first ranking data has a ranking correlation value with respect to the second ranking data $RKD_x$ equal to or larger than a predetermined threshold, the control section 10 proceeds to step SP15 and collates a registration image corresponding to the ranking (first ranking data RKD) having the ranking correlation value with respect to the second ranking data $RKD_x$ equal to or larger than a predetermined value with the comparison image based on a predetermined cross-correlation function. Then, in step SP16, the control section 10 determines whether the cross-correlation value obtained as a result of the collation is equal to or larger than a predetermined threshold.

When determining that the cross-correlation value is equal to or larger than a predetermined threshold in step SP16, the control section 10 proceeds to step. SP17 so as to execute a predetermined function and ends the authentication processing routine RT2.

On the other hand, when determining that the cross-correlation value is less than a predetermined threshold in step SP16 or the ranking correlation value is less than a predetermined threshold in step SP14, the control section 10 proceeds to step SP18 so as to notify, through the notification section 15 (FIG. 1), that authentication has failed and ends the authentication processing routine RT2.

In this way, the control section 10 can perform the authentication mode.

(3) Operation and Effects

With the above configuration, as shown in FIG. 3, the authentication apparatus 1 uses the reduced registration images IM1, IM2, and IM3 as references to determine the ranking among the reduced registration images IM1, IM2, and IM3 based on the similarities of the reduced registration images IM1, IM2, and IM3 used respectively as references with respect to the reduced registration image IM (so as to generate the first ranking data $RKD_1$, $RKD_2$, and $RKD_3$).

Further, as shown in FIG. 7, the authentication apparatus 1 determines the ranking among the reduced registration images IM1, IM2, and IM3 based on the similarities of the reduced registration images IM1, IM2, and IM3 with respect to the reduced comparison image IMx (so as to generate the second ranking data $RKD_x$).

In the case where none of the first ranking data $RKD_1$, $RKD_2$, and $RKD_3$ has a ranking correlation value with respect to the second ranking data $RKD_x$ equal to or larger than a predetermined threshold, the authentication apparatus 1 determines failure of authentication.

That is, the authentication apparatus 1 ranks the plurality of reduced registration images based on the similarity and uses the ranking itself as an element for determining the identification of the registrant. Therefore, in the case where any of the first ranking data $RKD_1$, $RKD_2$, and $RKD_3$ registered with the registration images has a ranking correlation value with respect to the second ranking data $RKD_x$ based on the similarities of the reduced registration images with respect to the reduced comparison image equal to or larger than a predetermined threshold, which means that the possibility that the reduced comparison image IMx is a reduced registration image corresponding to the registration image having the ranking correction value equal to or larger than a predetermined threshold is high and that the reduced comparison image IMx has a certain similarity with other reduced registration images that have been compared to the reduced comparison image IMx, so the authentication apparatus can grasp that the reduced registration image IMx has not been illegally input as pseudo data that temporarily coincides with the registration data.

As a result, even when a pseudo image that temporarily coincides with the registration data is input, the authentication apparatus 1 prevents a third party from being erroneously approved as a valid user with a higher accuracy than a method of simply comparing the reduced comparison image and reduced registration image with each other.

In addition, the authentication apparatus 1 calculates the similarity between the images at the time of ranking by using the reduced image. Thus, even in the case where a CPU has a low processing capability and thus cannot perform calculation of floating point numbers, it is possible to reduce the time required for data registration and collation without degrading the ranking accuracy.

With the above configuration, it is possible to grasp an input of a pseudo image that temporarily coincides with the registration data, thereby reducing the possibility of spoofing. As a result, the authentication apparatus 1 capable of improving authentication accuracy can be achieved.

(4) Other Embodiments

Although a vein pattern image is used as the registration data in the above embodiment, the present invention is not limited to this, but other various biological patterns such as fingerprint, lip print, and nerve may be used. Further, in place of the image, e.g., a password and the like may be used as the registration image.

Further, although collation between the images is performed after the collation between the ranking data in the above embodiment, the present invention is not limited to this, but collation between the ranking data may be performed after collation between the images.

Further, although the ranking among the ranking data is determined in the descending order in terms of the cross-correlation values in the above embodiment, the present invention is not limited to this, but the ranking among the ranking data may be determined in the ascending order in terms of the cross-correlation values.

Further, although the ranking is determined based on the similarity between the reduced images which have been obtained through image reduction processing in the above embodiment, the present invention is not limited to this, but the image reduction processing may be omitted.

Further, although the same finger is placed on the image-pickup position several times for image pickup operation and feature extraction processing is applied to the picked up images so as to acquire a plurality of registration image data in the above embodiment, the present invention is not limited to this. For example, the following method as shown in FIGS. 10(A) to 10(E), may be employed. That is, a finger is sequentially picked up while being rotated along the curved surface of the finger pad at a predetermined placement position within the image pickup range of the image pickup section 12 or a finger in resting state is sequentially picked up while the image pickup section 12 is rotated along the curved surface of the finger pad, followed by application of the feature extraction processing to part of or the entire picked up image.

Further, although a plurality of biological patterns are acquired from the same part of the same person in the above embodiment, the present invention is not limited to this, but one biological pattern of the same part may be acquired respectively from a plurality of persons classified as a group. That is, various embodiments may be applied to the registration images as long as the registration images are images of the same biological part which have been obtained from image pickup operation performed at the different image pickup positions within a predetermined image pickup range.

Further, although the control section 10 expands a program stored in a ROM on a RAM, and executes the vein registration mode and authentication mode in accordance with the program in the above embodiment, the present invention is not limited to this, but the vein registration mode and authentication mode may be executed in accordance with a program installed from a recording medium such as a CD (Compact Disc), a DVD (Digital Versatile Disc), a semiconductor memory, etc., or a program downloaded from the Internet.

Further, the feature extraction section 21, reduced image generation sections 22 and 32, ranking sections 23 and 33, registration section 24 and collation section 34 are configured by software in the above embodiment, the present invention is not limited to this, but all or some of these sections may be configured by hardware.

Further, although the authentication apparatus 1 provided with the image pickup function, collating function, and registration function is employed in the above embodiment, the present invention is not limited to this, but various configurations may be employed according to various applications such as a configuration in which the authentication apparatus 1 is divided to individual devices for the respective functions.

INDUSTRIAL APPLICABILITY

The present invention can be applied to the field of authentication.

EXPLANATION OF REFERENCE SYMBOLS

1 AUTHENTICATION APPARATUS
10 CONTROL SECTION
11 OPERATION SECTION
12 IMAGE PICKUP SECTION
12a DRIVE CONTROL SECTION
13 FLASH MEMORY
14 EXTERNAL INTERFACE
15 NOTIFICATION SECTION
15a DISPLAY SECTION
15b VOICE OUTPUT SECTION
21 FEATURE EXTRACTION SECTION
22, 32 REDUCED IMAGE GENERATION SECTIONS
23, 33 RANKING SECTIONS
24 REGISTRATION SECTION
34 COLLATION SECTION
RT1 REGISTRATION PROCESSING ROUTINE
RT2 AUTHENTICATION PROCESSING ROUTINE

The invention claimed is:

1. An authentication method, comprising:
 determining values establishing a first ranking of a plurality of reference images based on similarities between the reference images, the first ranking values being associated with corresponding ones of the reference images;
 determining values establishing a second ranking of the plurality of reference images based on at least the first ranking values, the second ranking values being associated with corresponding ones of the reference images, and the second ranking values being indicative of similarities between the corresponding references images and a comparison image associated with a registrant;
 identifying at least one of the reference images having a second ranking value that exceeds a threshold ranking value; and
 authenticating the registrant based on a correlation between the comparison image and the identified reference image, the authentication of the registrant failing when a value indicative of the correlation value between the comparison image and the identified reference image fails to exceed a threshold correlation value.

2. The authentication method of claim 1, wherein the reference images represent images of each of a biological part obtained from an image pickup operation performed at different image pickup positions within a predetermined image pickup range.

3. The authentication method of claim 1, wherein:
determining the values establishing the first ranking comprises:
  generating reduced image data corresponding to the reference images; and
  determining the first ranking values based on similarities between the reduced image data corresponding to the reference images; and
determining the values establishing the second ranking comprises:
  generating reduced image data corresponding to the comparison image; and
  determining the second ranking values based on similarities between the reduced image data of the reference and comparison images.

4. A registration apparatus, comprising:
ranking determining means for determining values establishing a first ranking and a second ranking of a plurality of reference images, the first ranking values being indicative of similarities between the reference images, and the second ranking values being based on at least the first ranking values and being indicative of similarities between corresponding ones of the reference images and a comparison image associated with a registrant;
identification means for identifying at least one of the reference images having a second ranking value that exceeds a threshold ranking value; and
authentication means for authenticating the registrant based on a correlation between the comparison image and the identified reference image, the authentication of the registrant failing when a value indicative of the correlation between the comparison image and the identified reference image fails to exceed a threshold correlation value.

5. A collation apparatus comprising:
ranking determining means for determining values establishing a first ranking and a second ranking of a plurality of reference images, the first ranking values being indicative of similarities between the reference images, and the second ranking values being based on at least the first ranking values and being indicative of similarities between the corresponding ones of the references images and a comparison image associated with a registrant;
identification means for identifying at least one of the reference images having a second ranking value that exceeds a threshold ranking value; and
collation means for authenticating the registrant based on a correlation between the comparison image and the identified reference image, the authentication of the registrant failing when a value indicative of the correlation between the comparison image and the identified reference image fails to exceed a threshold correlation value.

6. A tangible, non-transitory computer-readable medium storing instructions that, when executed by at least one processor, cause the at least one processor to perform a method, comprising:
determining values establishing a first ranking of a plurality of reference images based on similarities between the reference images, the first ranking values being associated with corresponding ones of the reference images;
determining values establishing a second ranking of the plurality of reference images, the second ranking values being associated with corresponding ones of the reference images based on at least the first ranking values, and the second ranking values being indicative of similarities between the corresponding references images and a comparison image associated with a registrant;
identifying at least one of the reference images having a second ranking value that exceeds a threshold ranking value; and
authenticating the registrant based on a correlation between the comparison image and the identified reference image, the authentication of the registrant failing when a value indicative of the correlation between the comparison image and the identified reference image fails to exceed a threshold correlation value.

7. A tangible, non-transitory computer-readable medium storing instructions that, when executed by at least one processor, cause the at least one processor to perform a method, comprising:
determining values establishing a first ranking and a second ranking for a plurality of reference images, the first ranking values being indicative of similarities between the reference images, and the second ranking values being based on at least the first ranking values and being indicative of similarities between the corresponding ones of the references images and a comparison image associated with a registrant;
identifying at least one of the reference images having a second ranking value that exceeds a threshold ranking value; and
authenticating the registrant based on a correlation between the comparison image and the identified reference image, the authentication of the registrant failing when a value indicative of the collation between the comparison image and the identified reference image fails to exceed a threshold correlation value.

8. The registration apparatus of claim 4, further comprising storage control means for storing the first and second ranking values.

9. The collation apparatus of claim 5, further comprising storage control means for storing the first and second ranking values.

10. The tangible, non-transitory computer-readable medium of claim 6, wherein the method further comprises storing the first and second rankings.

* * * * *